I. JONES.
DETACHABLE COFFEE POT HANDLE.
APPLICATION FILED DEC. 8, 1915.
1,231,372.
Patented June 26, 1917.
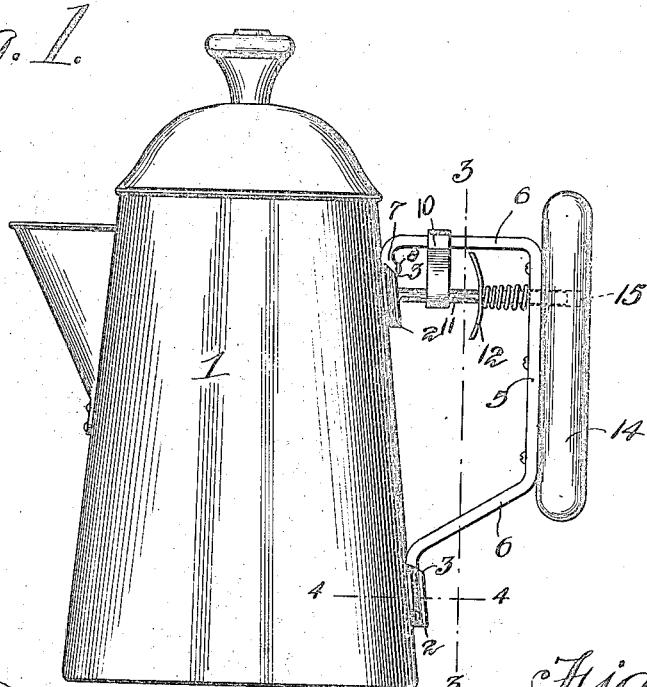
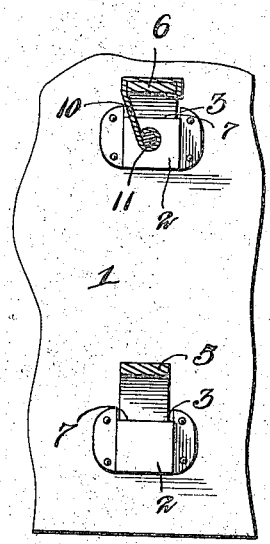
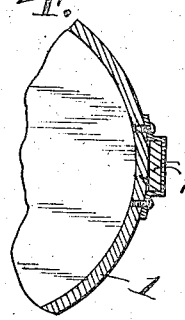
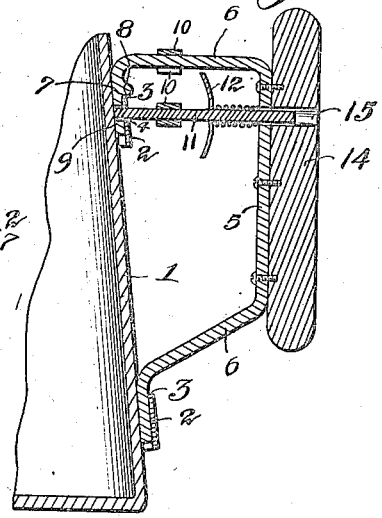
Inventor
Ira Jones
By Victor J. Evans
Attorney
Witness
C. J. Maddox

UNITED STATES PATENT OFFICE.

IRA JONES, OF POTTSTOWN, PENNSYLVANIA.

DETACHABLE COFFEE-POT HANDLE.

1,231,372.   Specification of Letters Patent.   Patented June 26, 1917.

Application filed December 8, 1915. Serial No. 65,845.

*To all whom it may concern:*

Be it known that I, IRA JONES, a citizen of the United States, residing at Pottstown, in the county of Montgomery and State of Pennsylvania, have invented new and useful Improvements in Detachable Coffee-Pot Handles, of which the following is a specification.

This invention relates to a detachable handle for coffee pots or similar receptacles and consists in the novel features hereinafter described and claimed.

The handle is designed especially to be used upon similar receptacles or utensils and particularly those which have to be handled while hot, and in which it is desirable to prevent the handle becoming too hot to be used.

The invention has for its object; to provide a receptacle of this nature with a removable handle; to provide a removable handle which may be very easily and conveniently engaged with the receptacle which at the same time very securely and tightly engages the receptacle; to provide a removable handle in which the weight of the receptacle has no tendency to disengage the handle; and finally to provide a handle having a securing catch easily operable from the hand engaging the handle and in which said catch is not depended upon exclusively to support the weight of the receptacle.

In the accompanying drawings,

Figure 1 is a side elevation of a coffee pot with the handle applied.

Fig. 2 is a vertical sectional view of the handle.

Fig. 3 is a sectional view of the same cut on the line 3—3 of Fig. 1.

Fig. 4 is a similar view cut on the line 4—4 of the same figure.

As illustrated in the accompanying drawings the pot 1 is of the usual configuration and is provided in the vicinity of its upper and lower end at one side with loops 2.

The said loops 2 are provided at their upper edges with recesses 3 and the uppermost loop 2 is provided at its intermediate portion with an aperture 4.

The handle comprises a metallic bracket 5 having at its upper and lower portions outstanding arms 6, the said arms 6 are provided with downwardly disposed extremities 7 which are adapted to fit snugly in the loops 2 whereby the end portions of the arms 6 may fit in the recesses 3 of the said loops. The uppermost extremity 7 is provided at its side adjacent the intermediate portion of the bracket 5 with an outstanding shoulder 8. The said extremity is provided at a point below the said shoulder 8 with an opening 9. A guide 10 carried at the uppermost arm 6 has a catch bolt 11 slidably mounted in the guide 10 and is adapted to enter the opening 9 when the said bolt is in projected position. A trigger piece 12 is mounted upon the catch bolt 11 and a spring pressed means is interposed between the intermediate portion of the bracket 5 and the trigger piece 12 and is under the tendency to normally hold the end portion of the catch bolt 11 in the opening 9 in the uppermost extremity 7 of the handle structure. The handle grip 14 is mounted upon the intermediate portion of the bracket 5 and the said intermediate portion of the bracket and the said handle grip are apertured as at 15 to receive the outer portion of the bolt 11 when the said bolt is moved to a retracted position in the said guide 10.

When the handle is applied to the pot or receptacle the extremities 7 are slipped down into the loops 2 while the end portions of the arms 6 may engage the recesses 3 at the upper edges of the said loops. When the bolt 11 moves into alinement with the aperture 4 the tension of the spring 13 comes into play whereby the bolt is moved longitudinally and passes through the aperture 4 and enters the opening 9 in the uppermost extremity 7. Then the handle is secured into the side of the pot. To remove the handle the operator grasps the grip 14 and passes three fingers around the trigger piece 12 and moves the said trigger toward the intermediate portion of the bracket 5. During this movement the spring 13 is compressed while the bolt 11 is withdrawn from the opening 9 and from the aperture 4 in the uppermost loop 2. When the said bolt is disengaged from the said opening and aperture the handle may be moved vertically with relation to the pot whereby the extremities 7 are lifted out of the loops 2. This arrangement provides for a very rigid connection between the handle and the receptacle.

The edges of the recesses 3 provided at the upper portions of the loops 2 assist in directing the extremities 7 into the said loops when the handle is being applied and they also assist the bolt 11 in holding the handle in position when applied.

Having thus described the invention what is claimed is:—

In combination with a receptacle provided at its sides with loops having recesses located at their upper edges and a handle comprising a bracket having outstanding arms and provided with extremities adapted to pass through the recesses and enter the loops whereby the end portions of the arm may fit in the recesses of the loops, one of the extremities being provided with an opening and one of the loops being provided with an aperture and a spring pressed catch bolt slidably mounted upon the handle and adapted to enter the said aperture and the opening whereby the handle is secured in position with relation to the receptacle.

In testimony whereof I affix my signature in presence of two witnesses.

IRA JONES.

Witnesses:
G. H. BARTHOLOMEW,
BIRGER SEAGUID.